(12) United States Patent
Wallace et al.

(10) Patent No.: US 10,434,683 B2
(45) Date of Patent: Oct. 8, 2019

(54) APPARATUS FOR FACILITATING PEELING OF LINED CONTAINERS

(71) Applicant: Converter Manufacturing, LLC, Orwigsburg, PA (US)

(72) Inventors: Millard F Wallace, Orwigsburg, PA (US); Tim McKeever, Orwigsburg, PA (US)

(73) Assignee: Converter Manufacturing, LLC, Orwigsburg, PA (US)

( * ) Notice: Subject to any disclaimer, the term of this patent is extended or adjusted under 35 U.S.C. 154(b) by 0 days.

(21) Appl. No.: 15/763,987

(22) PCT Filed: Sep. 26, 2016

(86) PCT No.: PCT/US2016/053701
§ 371 (c)(1),
(2) Date: Mar. 28, 2018

(87) PCT Pub. No.: WO2017/058711
PCT Pub. Date: Apr. 6, 2017

(65) Prior Publication Data
US 2018/0264686 A1    Sep. 20, 2018

Related U.S. Application Data

(60) Provisional application No. 62/233,635, filed on Sep. 28, 2015.

(51) Int. Cl.
*B32B 43/00*    (2006.01)
*B29B 17/02*    (2006.01)
(Continued)

(52) U.S. Cl.
CPC ............... *B29B 17/02* (2013.01); *B09B 3/00* (2013.01); *B29B 17/00* (2013.01); *B32B 43/006* (2013.01);
(Continued)

(58) Field of Classification Search
CPC ......... Y10T 156/1168; Y10T 156/1978; B32B 43/006; B29B 2017/0217; B65F 1/12; B65F 1/1463; Y10S 156/921; Y10S 156/936
See application file for complete search history.

(56) References Cited

U.S. PATENT DOCUMENTS

| 1,220,640 A * | 3/1917 | Kelly ........................ B65F 1/12 |
| | | 248/129 |
| 3,930,630 A * | 1/1976 | Wulff ..................... A47L 9/325 |
| | | 248/129 |

(Continued)

OTHER PUBLICATIONS

WIPO, Written Opinion of the ISA for parent application PCT/US2016/053701, dated Jan. 26, 2017.

*Primary Examiner* — Mark A Osele
(74) *Attorney, Agent, or Firm* — Gary D. Colby; Clearly Clean Products, LLC

(57) ABSTRACT

The disclosure relates to an apparatus for securely (and preferably reversibly) holding a container having a concave interior portion while a liner that abuts the concave interior portion 5 is removed from the container by peeling it therefrom. The apparatus includes a container holder having one or more holding surfaces, such as the interior of an orifice that extends through it. A holding surface (e.g., an O-ring or ridge) secures the container temporarily and reversibly, and prevents the container from disengaging from the container holder during peeling of the liner. An optional deflector can deflect a tab portion of the liner to facilitate its 10 removal from the container. After the liner is removed, the remaining portion of the container can be removed from the apparatus (e.g., and recycled).

12 Claims, 5 Drawing Sheets

(51) Int. Cl.
*B65F 1/14* (2006.01)
*B65D 65/40* (2006.01)
*B65D 51/24* (2006.01)
*B29B 17/00* (2006.01)
*B09B 3/00* (2006.01)
*B29L 31/00* (2006.01)

(52) U.S. Cl.
CPC ............ *B65D 51/24* (2013.01); *B65D 65/40* (2013.01); *B65F 1/14* (2013.01); *B65F 1/1463* (2013.01); *B29B 2017/022* (2013.01); *B29B 2017/0217* (2013.01); *B29L 2031/712* (2013.01); *B29L 2031/7174* (2013.01); *Y02W 30/622* (2015.05); *Y10S 156/921* (2013.01); *Y10S 156/936* (2013.01); *Y10T 156/1168* (2015.01); *Y10T 156/1978* (2015.01)

(56) References Cited

U.S. PATENT DOCUMENTS

| | | | |
|---|---|---|---|
| 4,739,882 A | | 4/1988 | Parikh |
| 4,793,161 A | * | 12/1988 | Richter ............... B01D 33/0315 |
| | | | 68/181 R |
| 5,316,248 A | * | 5/1994 | Allen ..................... B62B 1/16 |
| | | | 248/129 |
| 6,240,937 B1 | * | 6/2001 | Salda ..................... B08B 9/42 |
| | | | 134/152 |
| 7,500,443 B1 | | 3/2009 | Allen |
| 7,516,852 B1 | | 4/2009 | Rehurek |
| 9,102,430 B2 | * | 8/2015 | Monti ............... B65B 69/0033 |
| 9,902,584 B2 | * | 2/2018 | Kramer ............... B65H 18/10 |
| 2009/0208316 A1 | * | 8/2009 | Mayer .................. B65B 69/00 |
| | | | 414/729 |
| 2009/0290963 A1 | | 11/2009 | Hopkins |

* cited by examiner

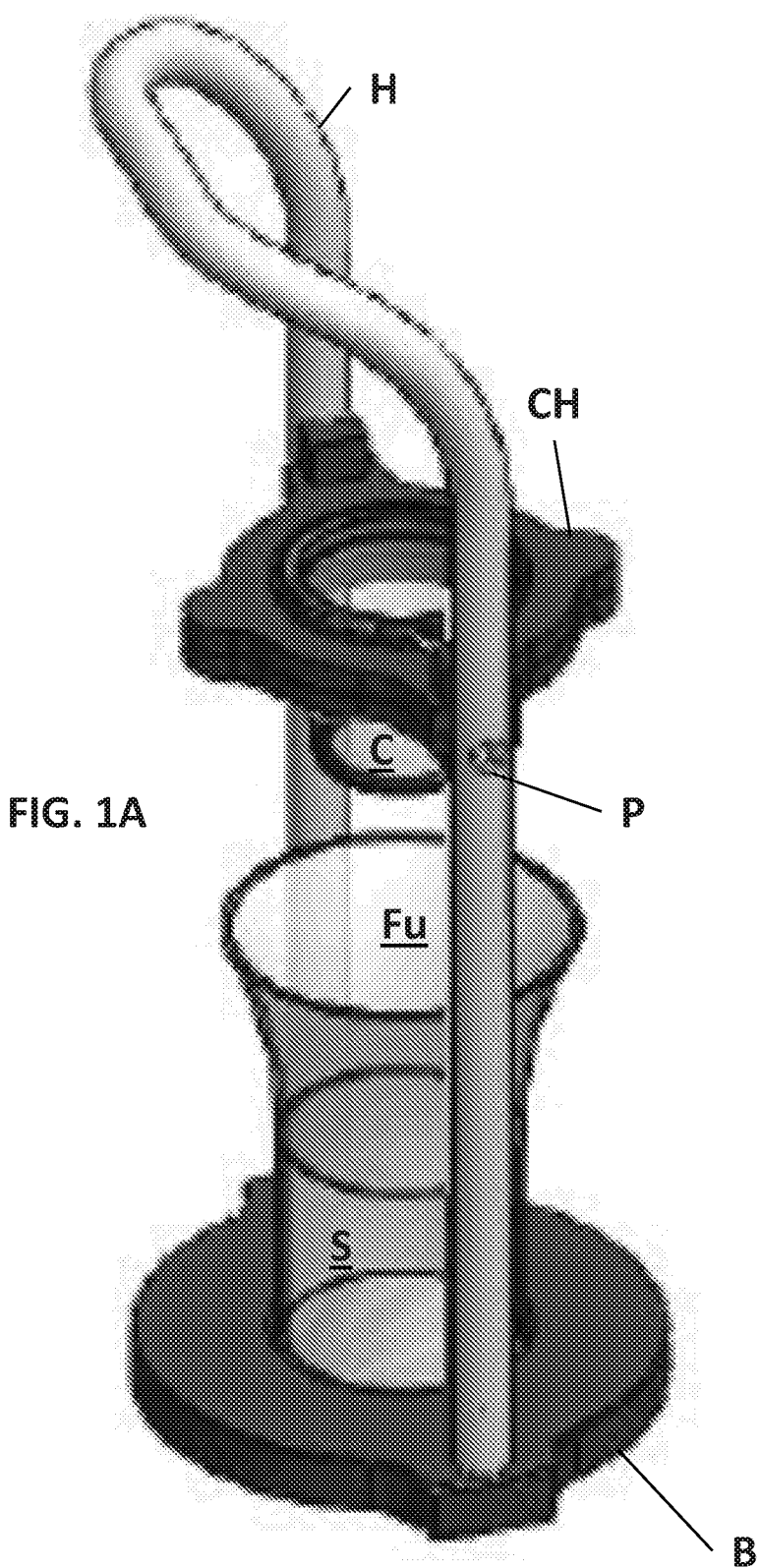

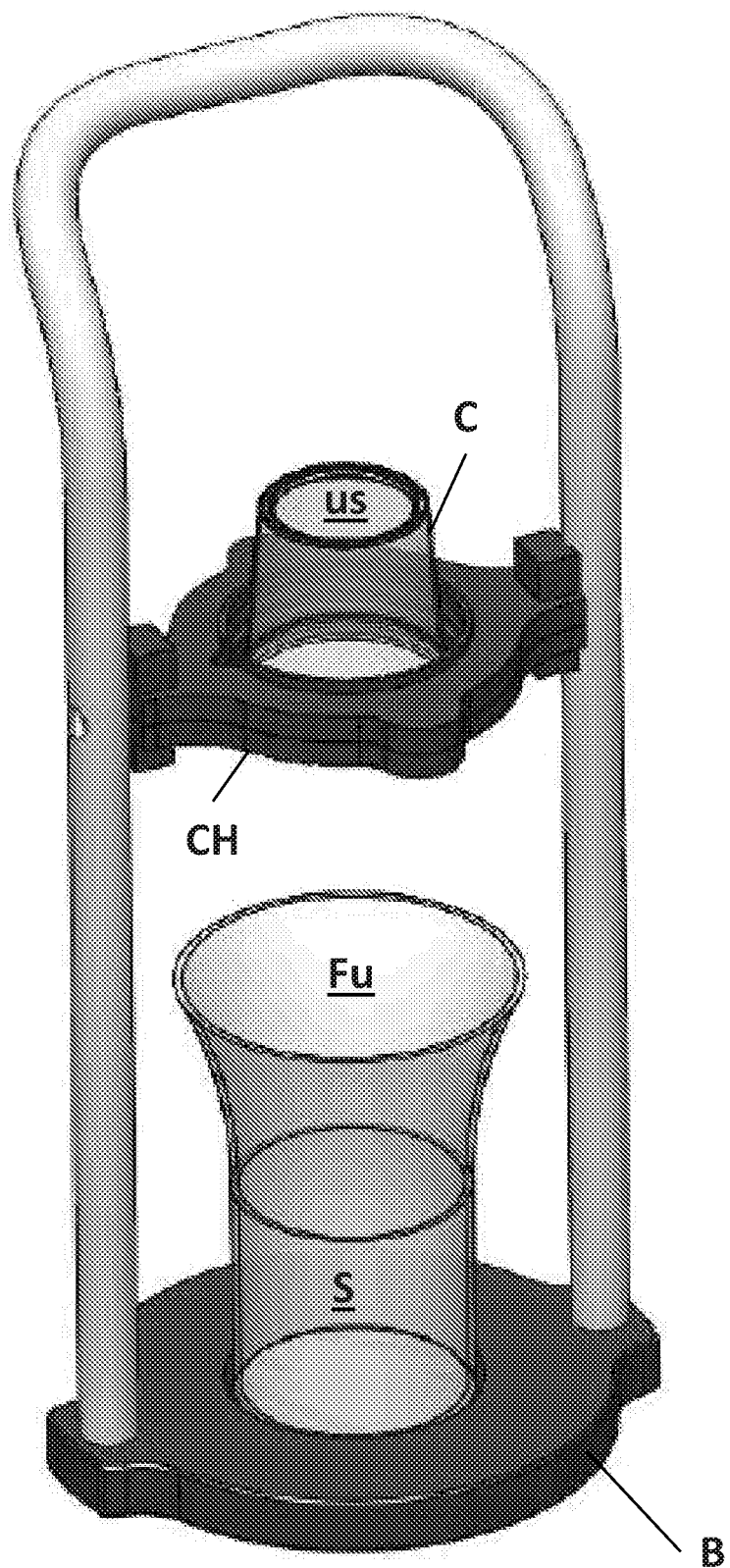

APPARATUS FOR FACILITATING PEELING OF LINED CONTAINERS

BACKGROUND OF THE DISCLOSURE

The invention relates generally to the field of facilitating recycling of containers which include a composite of recyclable and non-recyclable components.

Modern packages and packaging methods enable a wide variety of products to be contained and shielded from environmental contact during storage, shipping, and sale. Plastic packaging, in particular, offers tremendous flexibility in packaging opportunities. Shortcomings of plastic packaging materials, however, include their long lifespan in the environment and the non-suitability of plastics for recycling when the plastics are mixed with other materials (e.g., when they are mixed with paper, metals, or food waste). The long time period required for most plastics to degrade in the environment makes plastics undesirable in the waste stream. Reducing the quantity of plastics in the waste stream is therefore a significant and long-standing need. Technology useful for increasing the fraction of plastic in the waste stream that can be diverted from landfill and incineration and into recycling operations would be beneficial. Such technology is disclosed herein.

Among recent advances in packaging has been the advent of packages lined with thin plastic sheets or layers. By way of example, co-owned U.S. patent application publication number 2012/0228306 describes a variety of containers in which thin plastic sheets soiled with (for example) food wastes (i.e., rendering those plastic sheets unacceptable for the recycling programs of many municipal systems) can be peeled from recyclable portions of containers, the relatively small quantity of soiled plastic sheets being discarded as waste, while the relative large quantity of remaining container materials are suitable for recycling streams.

For relatively large containers (e.g., large tray-shaped containers, such as those used for supporting cuts of meat or for packaging household-sized quantities of fruits or vegetables), the value of recycling the bulk of the large containers is immediately apparent to consumers, and many consumers will peel surface sheets and recycle the bulk containers. However, for relatively small containers (e.g., those used to contain individual servings of foods or beverage components), at least some consumers may consider the quantity of material in the small container insufficient to justify the difficulty or hassle of peeling container liners and recycling the (small) bulk container.

An example of such containers are small, cup-shaped containers which contain ingredients (e.g., ground coffee or tea leaves) sufficient to make individual servings of beverages. These containers tend to be smaller than an average hen's egg, and therefore appear to consumers not to contain an amount of recyclable material sufficient to justify complicated recycling procedures. However, because these containers are typically used for single servings only, large numbers of such containers (including relative large amounts of recyclable plastic) can be used, especially at centralized locations such as offices, cafeterias, and kitchens. These cups, for example, can be made with a peelable liner having a lidstock securely fastened to the liner so that, following their use, the liner, lidstock, and materials (e.g., used coffee grounds or spent tea) contained between them can be pulled away from a plastic cup to which the liner is bound, and the cup can be recycled while the other materials are discarded. While these cups facilitate such recycling, they may not be widely used unless removal of non-recyclable elements is simple, easy, and perhaps even 'fun.'

Apparatus and methods for easing the peeling of non-recyclable materials from recyclable containers are disclosed herein and are expected to enhance the willingness of end users to separate recyclable and non-recyclable materials in lined containers.

BRIEF SUMMARY OF THE DISCLOSURE

The invention relates to an apparatus for peeling a liner from a lined container that includes a substrate having an outer surface and a liner that abuts a concavity defined by the substrate. The apparatus includes a container holder for reversibly securing the lined container in a configuration amenable for peeling the liner therefrom across the open end of the concavity. The container holder has at least on holding surface that conforms to the outer surface of the container for securing the container during peeling of the liner therefrom. The container holder is mounted to a base that is sufficiently non-movable to maintain the container holder in place during peeling of the liner from the container.

In one embodiment, the container holder is pivotally mounted to a handle that is fixed to the base. The container holder is pivotable between a first position at which the liner can be peeled therefrom and a second position at which the container can be ejected from the container holder. By way of example, the container holder can be invertable—that is, pivotable between an upright position in which the container can be reversibly secured within an orifice extending through the container holder by inserting the container into the orifice, at least one holding surface defining an edge of the orifice, and an inverted position in which the container can be ejected from the container holder by urging the container back through the orifice. The container holder can include a holding surface that extends into the orifice, in order to better secure the container in the orifice when the container is inserted into the orifice. The container holder can also include a locking mechanism for reversibly maintaining the container holder in at least one of the upright and inverted positions. The container holder can be pivotally mounted between a pair of handles, such as a pair of handles formed of a unitary piece of material.

The apparatus can include a storage receptacle situated at the second position, the storage receptacle being capable of containing at least two stacked containers after they have been ejected from the container holder. The apparatus can further include a funnel for directing containers ejected from the container holder into the storage receptacle. For example, the funnel can have a flared conformation and a funnel orifice extending therethrough, so that the funnel orifice communicates with the interior of the storage receptacle. In this example, the outwardly flared end of the funnel faces the container holder.

The container holder can include a deflector that impinges upon and deflects a tab that extends from the periphery of the liner when the container is engaged with the container holder. By way of example, when the container holder defines an orifice extending therethrough, the deflector can be a raised ridge adjacent the orifice (e.g., extending about substantially the entire periphery of the orifice).

In one embodiment, the apparatus includes an invertible container holder having an orifice that extends therethrough and including a stop extending into the orifice (e.g., an O-ring that is embedded in the container holder and extends into the orifice) for reversibly securing the lined container within the orifice while the liner is peeled therefrom. The container holder is pivotally mounted between a pair of handles that are fixed to a base. The base includes a storage receptacle at a space for receiving the container upon ejection from the container holder. The storage receptacle is capable of containing at least two nested containers after they have been ejected from the container holder. The base also includes a funnel interposed between the container holder and the storage receptacle. The funnel has a flared conformation and a funnel orifice extending therethrough. The funnel orifice communicates with the interior of the storage receptacle, and the outwardly flared end of the funnel faces the container holder. In this embodiment, the invertible container holder is rotatable between i) an upright position in which the container can be inserted through an orifice extending through the container holder and reversibly secured therein while the liner is peeled from the substrate by grasping the tab and peeling it from the substrate and ii) an inverted position in which the container can be ejected from the container holder, through the funnel, and into the storage receptacle by urging the container back through the orifice.

BRIEF SUMMARY OF THE SEVERAL VIEWS OF THE DRAWINGS

FIG. 1 includes FIGS. 1A, 1B, and 1C. FIG. 1A is an isometric view of the apparatus described herein. A container C is inserted within the orifice of the container holder CH of the apparatus, which is mounted between two upright handles H (here, made from a unitary piece of material) using two pivots P. The apparatus is shown with a container C secured in place within the orifice of the container holder. The handles H are attached to a base B, which supports a storage receptacle S in which containers can be nested and stored (see FIG. 3). A funnel Fu is interposed between the storage receptacle S and the underside of the container holder CH and a funnel orifice that extends through the funnel Fu communicates with the interior of the storage receptacle S. In FIG. 1B, an optional locking mechanism LM for reversibly maintaining the container holder CH in an upright position (shown here) and/or an inverted position (not shown here; the container holder CH can rotate or flip between the upright and inverted positions) is associated with the container holder CH.

FIG. 2 is an isometric view of the apparatus described herein, the apparatus having a container C emplaced within the orifice O of the container holder CH, with the container holder CH being oriented in the inverted position. In this inverted position, force applied downwardly (i.e, in the direction from the container toward the base B) to the container C (such as gravitational force or a manually-applied tap on its underside us) can dislodge the container C from the container holder CH, causing the container C to fall or move toward a funnel Fu and/or a storage receptacle S.

DETAILED DESCRIPTION

Figure 1B:
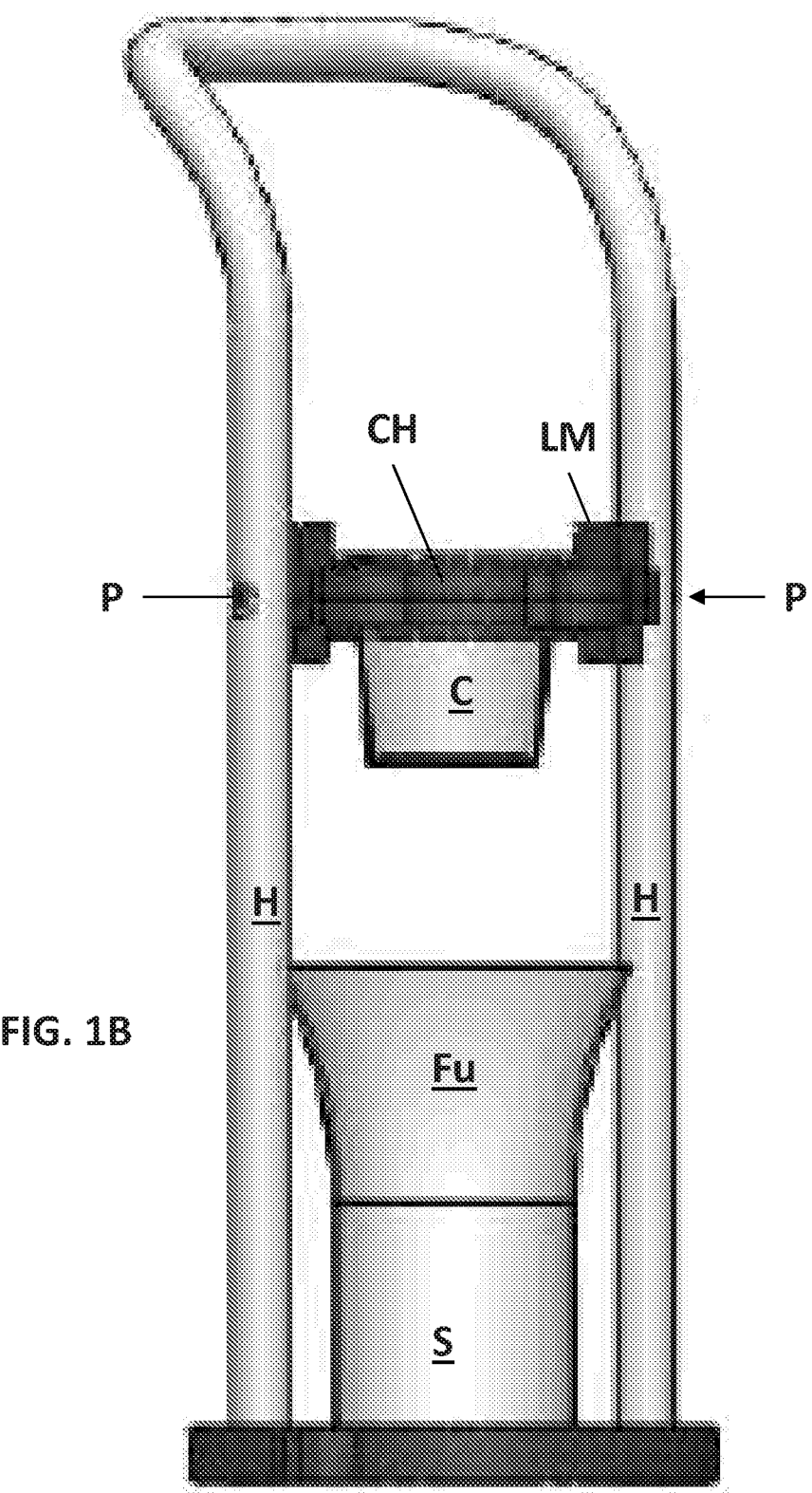
FIG. 1B is a side view of the same apparatus.

The disclosure relates to an apparatus that is useful for assisting a person to peel a liner from the interior of a lined container. The container includes a substrate that defines a concavity, at least a portion of which is lined by a liner. Grossly simplified, the apparatus secures the container at a fixed position and in a conformation in which a portion of the liner can be grasped by the person and peeled across the open end of the concavity without displacing the container from the apparatus. The apparatus preferably has a container holder that is shaped in a manner that conforms to the shape of the container (e.g., the outer surface of the container), the better to hold the container fast during peeling of a liner therefrom. The apparatus can also have a frictional material disposed at or on a portion of the container holder for decreasing the likelihood that the container will be displaced therefrom during peeling of a liner from the container.

In one embodiment, after peeling the liner from the container, the person can pivot (e.g., invert) a portion of the apparatus to simplify displacement of the de-lined container from the apparatus. Optionally, the apparatus can include a receptacle into which the de-lined container can be deposited and, if desired, stored in a stack of de-lined containers. Such a receptacle can be situated at or near the position to which the portion of the apparatus is pivoted for displacement of the container, so that the container can be displaced from the container holder directly into the receptacle. Such direct delivery of the displaced container into the receptacle can be especially beneficial in conditions in which the container is expected to be hot, soiled, or otherwise undesirable to touch or grasp with exposed skin (e.g., displacement of a used container used to contain coffee during brewing). The apparatus facilitates recycling of containers by permitting the containers to be separated from components associated with the liner.

The apparatus is believed to have particular suitability for facilitating recycling of relative small containers, such as single-portion-sized packages of beverage components (e.g., ground coffee or tea) or condiments (e.g., dipping sauces, milk, cream, or beverage whiteners). Owing to the small bulk of these containers and the relative difficulty of manually peeling bound liners from them, many consumers may choose to forego the hassle of recycling these containers. The apparatus described herein eases peeling of liners from small packages, and should serve to encourage recycling of the recyclable portions of such containers.

The apparatus includes two critical components, namely a container holder and a handle. The container holder is pivotally mounted to the handle and is pivotal between an upright position and an inverted position. The container holder includes an orifice into which the container can be inserted and securely held while a liner is peeled from the interior of the container. The liner is peeled from the container while the container is contained within the orifice, while the container holder is in the upright position. In addition to providing a mounting point for holding the container holder in place, the handle can also provide a grasping point for the person peeling the liner, enabling the person to steady the apparatus and apply force using both arms, if desired, during peeling of the liner. After peeling, the container holder is pivoted to the inverted position, and the container is dislodged from the container. The separated liner and container can then be handled separately.

In an important embodiment, the container is a single-portion-size container used for making a beverage such as coffee. In this embodiment, a plastic liner lines the entire interior of the recyclable 'cup' portion of the container, up to and including the upper, open end of the interior. The open end of the cup is sealed with a lidstock (e.g., a laminated paper-plastic composite sheet or a laminated metal foil-plastic composite sheet used as a lidding) that is relatively tenaciously bound with the interior of the liner (i.e., the portion of the liner opposite the face bound to the recyclable portion of the cup). Contained within the compartment defined by the liner and the lidstock are beverage components, such as coffee grounds. When the liner is peeled from the container, the lidstock can remain sealed to the liner and the liner, the lidstock, and the contents of the compartment can be removed together from the recyclable portion of the container. Optionally, the lidstock and liner can be selected to be peelable from one another, so that the two can be separated and the contents of the compartment can be accessed by a user. By way of example, a container of the type described in this paragraph can have a liner that is peelable from the interior of the container (including a flange that surrounds the open end of the container; a lidstock can be peelably bound to the liner at the flange, defining a compartment between the liner and the lidstock (e.g., containing ground coffee, dry before, and damp after, the container is used). Such a container can be used in at least three ways. First, the liner, lidstock, and compartment components can be peeled as a unit from the container and discarded. Second, the liner, lidstock, and compartment components can be peeled as a unit from the container and the compartment thereafter opened to release the contents (e.g., to facilitate delivery of used coffee grounds to a compost); the liner and lidstock can be fully separated and one, both, or neither can be recycled. Third, the lidstock can be peeled from the liner prior to peeling the liner from the container, so as to permit a user to access the compartment contents (e.g., to facilitate delivery of used coffee grounds to a compost). Thereafter, the liner can be peeled from the container. In all three instances, the container can be recycled (or otherwise disposed of) separately from the liner, the lidstock, and the compartment contents.

Significantly, containers of this type are often made to conform to size and shape specification that are carefully controlled, so that the containers fit within and can be used in particular beverage-making devices. The careful control exercised over the shape and size of the containers also makes them suitable use for a correspondingly-sized and -shaped apparatus described herein (i.e., apparatus having dimensions suited for accommodating such standardized containers). The apparatus described herein may be offered in connection with devices intended to use those containers. By way of example, the apparatus may be offered as a part of, an attachment to, or an accessory sold in connection with a machine designed for preparing individual portions of coffee using individual-portion-sized containers containing ground coffee. Such an apparatus may, for example, be paired with a beverage-preparing machine in such a way that the container is automatically deposited by the machine within the orifice of the container holder CH of the apparatus described herein following beverage preparation. If placement of the tab T is controlled during such deposition, the liner-peeling functionality may also be automated, and ejection of the de-lined container from the orifice of the container holder CH can also be automated using conventional devices.

In addition to the container holder CH and the handle H, the apparatus can include other elements, such as a base B for supporting the apparatus (or anchoring it to a surface), a storage receptacle S for containing de-lined containers (e.g., for containing multiple containers arranged in a nested stack), a funnel Fl for directing containers ejected from the container holder CH toward or into the storage receptacle S, and/or a locking mechanism LM for securing the container holder CH in one or more of its upright and inverted positions.

Further details of individual elements are now described.

A primary function of the container holder (element CH in the figures) is to maintain the container in a fixed position as the liner which lines the interior of the container is removed from the container. This function is performed by shaping the container holder CH in such a way that a container can be engaged with the container holder CH sufficiently robustly that the container remains engaged with (i.e., is not fully removed from) the container holder as the liner is removed from the container.

Generally speaking, such engagement entails forming the container holder so that its shape matches the shape of a portion of the exterior of the container over a sufficient portion of and at a position on that exterior that the container remains engaged with the container holder during liner removal. That is, the container holder includes one or more holding surfaces that conform to the shape of the exterior of the container when it is engaged with the container holder. The holding surface of the container holder can include a frictional material (e.g., rubber, an abrasive material, or a rough surface) at a holding surface to strengthen the engagement between the container and the container holder.

One embodiment of a container holder is illustrated in the figures and includes an orifice that extends completely through the container holder and completely surrounds a portion of the container when the container is engaged with the container holder. In the figures, this orifice O is a generally cylindrical hole that extends through container holder CH. Such an orifice O is designed so that a circular or annular holding surface of the container hold CH engages the exterior sides of the flared cylindrical cup-shaped container C shown in the figures and/or, a flange Fl that completely surrounds the periphery of the open end of the cup-shaped container C. Such an orifice need not, however, completely surround the container. The container holder CH illustrated in the figures could accommodate the container C shown therein even if the container holder CH encircled only three-quarters of the circumference of the container C, with the remaining quadrant of the container holder CH existing as a slot extending from the central orifice O to the peripheral edge of the container holder CH, for example. Similarly, a container holder CH having a square-shaped orifice O could engage the same flared cylindrical cup C shown in the figures, so long as the width of the square orifice were smaller than the diameter of the cup at any portion along its exterior height (i.e., so long as the round cup fits only partway through the square orifice).

In the apparatus illustrated in the figures, a notch within the interior sidewall that defines the orifice O can accommodate a frictional material (e.g., an elastomeric O-ring that fits within the notch and extends at least partially therefrom into the orifice) to better secure the container.

The container holder CH is pivotally mounted to the handle H, and preferably between a pair of handles H, as illustrated in the figures (the "pair" of handles can be two parts of the same piece of material, again as illustrated in the figures). The purpose of mounting the container holder CH to the handle(s) H is to position the container holder at a physical location at which the container can be engaged with the container holder and the liner of the container can be peeled therefrom. The handle can also provide a sturdy surface that can be grasped by a person peeling the liner, to better secure "leverage" or apply peeling force to the liner. Grasping the handle can also be used to stabilize the apparatus during peeling, if the apparatus is not securely mounted to an immovable object.

Mounting the container holder CH pivotally permits it to be pivoted between at least two positions: an 'upright' position in which the container can be easily engaged therewith and the liner can be peeled and an 'inverted' position in which the container can be more easily disengaged from the container holder than in the upright position. Despite the names used, the upright and inverted positions need not be exactly (or even approximately) displaced from one another by 180 degrees, but such an arrangement can be beneficial, in that an upright position in which the container can be 'dropped' (or otherwise engaged) into the container holder without passing entirely therethrough without being engaged makes the engagement simple for a user to perform. Similarly, an inverted position that is sufficiently (e.g., 180 degrees) vertically displaced from such an upright position can make disengaging the container simple for a user (e.g., the container may simply fall out under gravity when the inverted position is achieved, or no more than light tapping or pushing may be necessary to disengage the container from the container holder).

The precise nature of the pivotal mount is not critical, and any of the wide variety of pivotal mounts may be used (e.g., those depending on hinges, axles, deformable or deflectable portions of the container holder, handle, or an intermediate linked to one or both of these). The pivotal mount may have one or more 'stops' (i.e., physical obstructions to further pivoting) to prevent pivoting beyond one or both of the upright and inverted positions, or it may have 'bumps' (i.e., tactile indicators that a desired pivotal position has been achieved) to facilitate pivoting to one or both of those positions. The pivotal mount may also include a locking mechanism LM to prevent pivoting away from one or both of the upright and inverted positions. Each of these stop, bump, and locking mechanisms is well known in a variety of forms for pivotally mounted objects, and substantially any of these can be used. By way of example, the locking mechanism LM may be a combination of matched detents and notches that tend to secure the container holder in one or both of the upright and inverted positions more securely than in other pivotal positions.

In an important embodiment, the container holder CH is mounted to or on a device in which the container is employed, such as a beverage maker. When so mounted, the container holder CH should be situated such that a used container (e.g., a plastic container containing spent coffee within it) can be easily accessed by a user, for example to transfer the container from a position on or within the device at which it is used to the container holder CH. The container holder CH secures the container while a liner, a lidstock, or a compartment defined by a lidstock bound to a liner, is peeled from the container.

In one specialized embodiment, the container holder CH is used to secure the container during use of the container by the device. In this embodiment, simple mechanical means (e.g., "jaws" which grip the exterior of the container during operation of the device or upon insertion of the container therein) can be used to secure the container within the device prior to peeling the liner from the container, and other mechanical means can be included to reverse or decrease the grip strength of the securing means (e.g., a button which releases the "jaws"). By way of example, there are numerous coffee-brewing machines known which brew coffee using shaped plastic container. If the container has a peelable liner within its interior and a lidstock sealing the open end of the container and containing ground coffee between the lidstock and the liner, then the liner and lidstock can be peeled from the remainder of the plastic container (taking the grounds with them, if peeled together), facilitating recycling of the container. The machine can include a container holder CH at the position at which the container is inserted, and the container holder CH can including one or more gripping surfaces which are urged against the exterior of the container, either when the container is inserted into the container holder CH (e.g., a pair of arms having frictional surfaces which engage against the container as it is inserted) or when the machine is 'closed' to facilitate brewing (e.g., a pair of curved, frictional surfaces which engage against the container as the machine is closed). A "locking" or securing mechanism (a wide variety of these are known and substantially any can be used) can maintain the gripping surfaces engaged against the container while the liner and/or lidstock is peeled from it. A release mechanism suitable to disengage the locking or securing mechanism can be employed to permit a user to disengage the container from the machine, facilitating its removal and recycling.

Peeling of a liner from a container can be facilitated if a small portion (i.e., a tab T) of the liner extends beyond the surface(s) of the container against which the liner is opposed or bound. Grasping and pulling such a tab (i.e., substantially normal to or at a low acute angle with respect to the lined surface of the container) will tend to pull or peel the liner away from the container in the area immediately adjacent the tab, and continued pulling of the peeled portion of the liner can continue the peeling, eventually resulting in complete detachment of the liner from the container. The container holder can be arranged or shaped in a way that facilitates finding or grasping such a tab. This can be achieved, for example, by including on the container holder CH a deflector D that tends to deflect the tab T when the container C is engaged with the container holder CH.

Figure 1C:
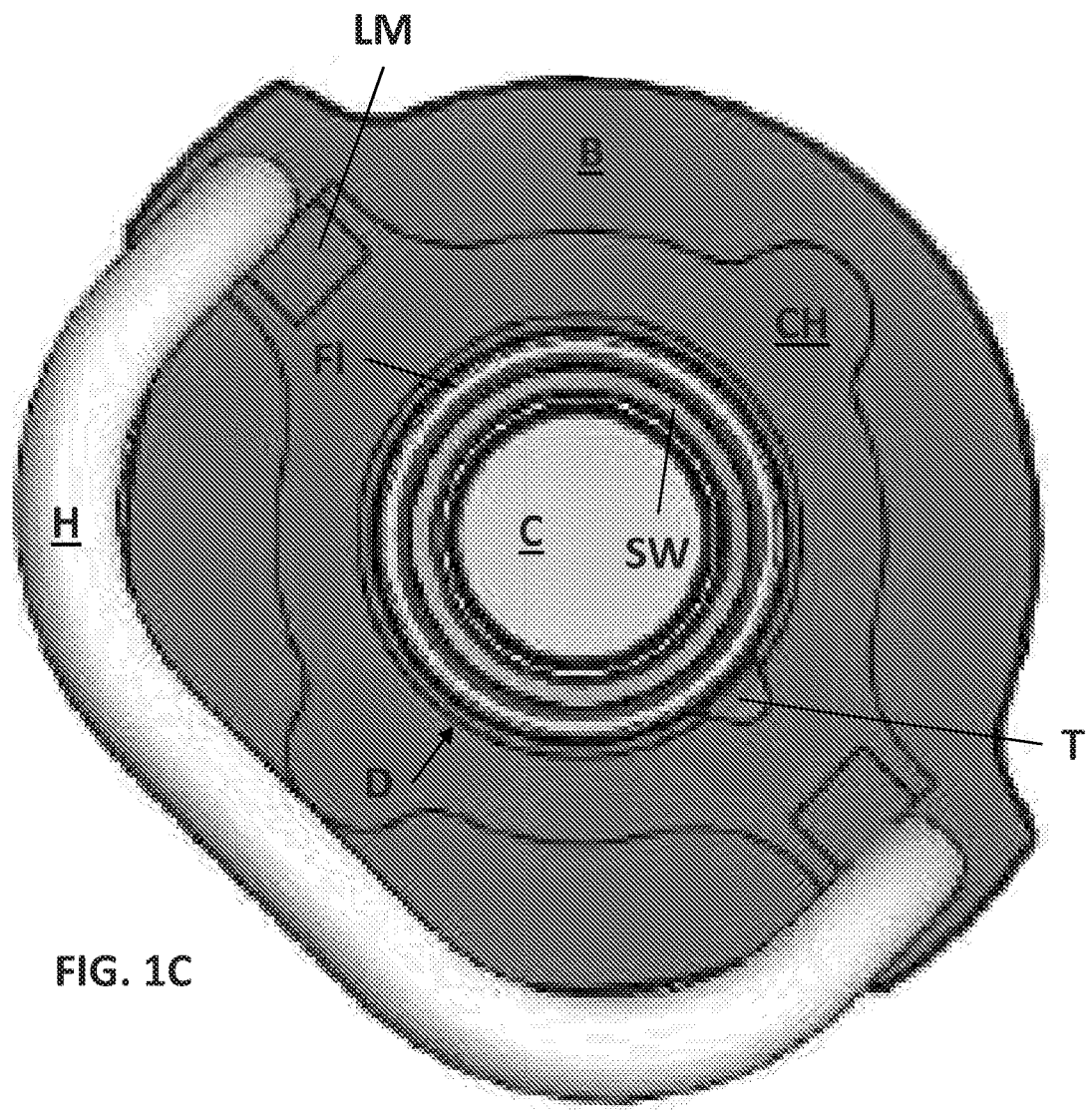
FIG. 1C is a top view of the same apparatus. In this top view, a container C can be seen residing in the orifice within the container holder CH. The container C in this embodiment is a flared cylindrical cup having an outwardly-oriented flange Fl encircling the cavity within the cup at its upper, wider end. In this embodiment, the container C does not include a lidstock bound to the flange Fl, so that the interior of the cup, including is flared sidewall SW is visible in this top view. All portions of the container C are covered by a peelable liner, the liner being opposed (or bound) against the interior of the cup. A tab portion T of the liner can be seen extending away from the flange Fl of the container C, the tab T having been displaced outwardly away from the outside side wall (not visible here) and/or upwardly toward the top of the container C by a deflector D (visible in this top view as a ridge surrounding the flange Fl, except where the tab T rests atop the deflector D). It can be seen in FIG. 1C that the handle H is offset from the space above (i.e., in the direction opposite the base) the container holder CH. This offset can facilitate grasping of the tab T by a user who wishes to peel the liner from the container C, such as by pulling the tab T laterally across the opening of the cup (which is secured within the orifice of the container holder CH) with one hand while holding the apparatus in place by grasping the handle with the other hand.

By way of example, the container holder CH illustrated in the figures has a raised ridge that encircles the orifice O on at least one face of the container holder CH. As seen in FIG. 1C, as a container C is inserted within the orifice O of the container holder CH, the deflector D deflects the tab T outwardly from the exterior side of the container C, making it simpler for a user to find, grasp, and pull.

The size, shape, materials, and placement of the handle(s) H are not critical. The handle H serves to pivotally mount the container holder CH, preferably at a position in which the container C is easily engaged with and disengaged from the container holder CH. Desirably, the handle supports the container holder CH at least two points, to facilitate durability of the apparatus and smoothness of pivoting. Also desirably, the handle is shaped and sized so that it conforms to the shape of a human hand, holding the apparatus in a configuration convenient for peeling of a liner from a container engaged with the container holder of the apparatus.

The handle(s) H can be mounted to a base B, which can be a discrete part of the apparatus or a part of a work surface (e.g., a kitchen or pantry countertop) at which the apparatus is to be used. In one embodiment, the base B is a device (e.g., a coffee-making machine) that uses the containers for which the apparatus is adapted. In that embodiment, the apparatus can be sold as an attachment to or an accessory for the device.

The apparatus can include a storage receptacle (element S in the figures) and/or a funnel Fu. Each of these is useful in handling of de-lined containers, the storage receptacle for containing one or (preferably) more de-lined containers ejected from the container holder, and the funnel for directing de-lined containers into the storage receptacle. Because the storage receptacle and the funnel are intended to assist handling of de-lined containers, they are preferably situated at or near the space into which containers are ejected from the container holder when it is in its inverted position.

Figure 3:
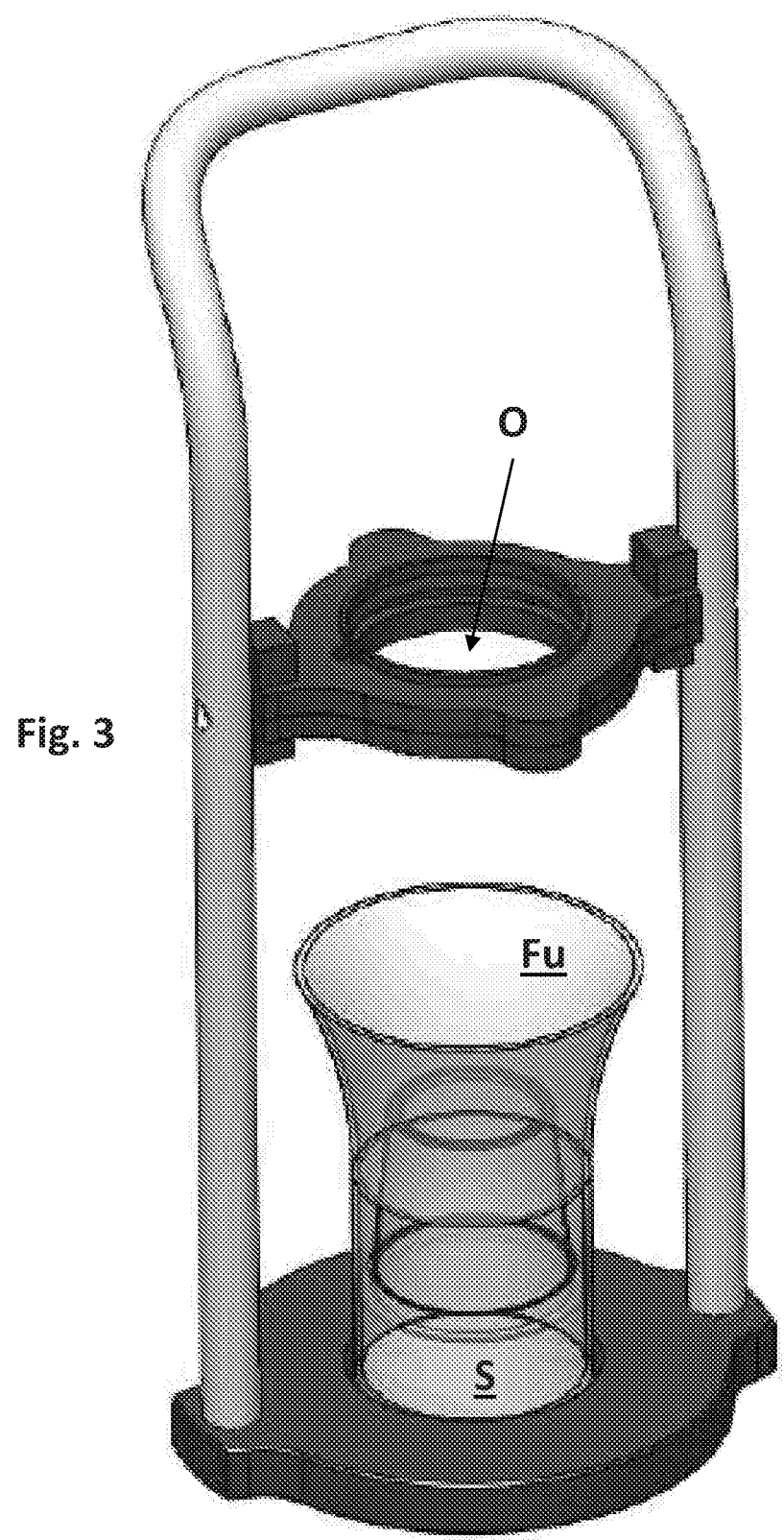
FIG. 3 is the same view shown in FIG. 2, except that the container has been dislodged from the orifice and has fallen downwardly through a funnel orifice that extends through the funnel Fu and come to rest within the interior of the storage receptacle S. In this view, the funnel Fu and storage receptacle S are depicted as being transparent, so that the presence of the container therein can be seen.

The purpose of the storage receptacle can contain multiple de-lined containers, which can be stored therein until, for example, the storage receptacle reaches its capacity or a recycling date approaches. If de-lined containers are nestable (e.g., like common disposable drinking cups), then they can be stacked within the storage receptacle. The storage receptacle can be removably attached to the base, for example, or it can be unassociated with any other component of the apparatus, other than being placed at or near a position at which de-lined containers are discharged. By way of example, in the figures, the simply a hollow cylinder that is placed within a matched cylindrical recess in the base B directly beneath (gravitationally) the container holder CH, so that when the container holder CH is pivoted to its inverted position (as in FIG. 2), a de-lined container discharged from the orifice O of the container holder CH will simply fall into the storage receptacle S, as shown in FIG. 3.

The function of the funnel is to direct containers discharged from the container holder CH into the storage receptacle S. The funnel Fu can be funnel shaped and have a funnel orifice extending therethrough, as shown in the figures. However, other shapes are possible (despite the name). The funnel Fu may, for example, be an object with one or more flat surfaces that simply tends to deflect discharged containers into the storage receptacle S. The precise shape, size, and nature of the funnel Fu are not critical, and it may be an integral part of the storage receptacle S. If the funnel Fu is detachable from the storage receptacle S, it can be simpler to remove stored containers from the storage receptacle S.

Materials and Methods of Construction

The material(s) from which the parts of the apparatus described herein are constructed are not critical. Substantially any material can be used; nonetheless, the materials should be selected to be able to withstand the stresses and strains expected during normal operation of the apparatus as described herein. Rigid plastics and metals, for example, are suitable for making most or all parts. High friction materials (e.g., natural or artificial rubbers) may be desirable at the interface between the container and the container holder to help secure the two.

The methods used to form and assemble the parts are also conventional, and no specialized instruction is necessary. A skilled artisan can readily construct the devices in view of the information provided herein.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. An apparatus for peeling a liner from a lined container that includes a substrate having an outer surface and a liner that abuts a concavity defined by the substrate, the apparatus comprising
   a container holder for reversibly securing the lined container in a configuration amenable for peeling the liner therefrom across the open end of the concavity, the container holder including at least one holding surface that is the outer surface of an O-ring that
      is embedded in an orifice extending through the container holder,
      extends into the orifice,
      defines an edge of the orifice, and
      conforms to the outer surface of the container
   for securing the container during peeling of the liner therefrom, the container holder being mounted to
   a base sufficiently non-movable to maintain the container holder in place during peeling of the liner from the container,
   wherein the container holder is
      pivotally mounted to a handle that is fixed to the base and
      invertable and pivotable between
         a first upright position in which the container can be reversibly secured within the orifice by inserting the container into the orifice and in which first position the liner can be peeled therefrom, and
         a second position at which the container can be ejected from the container holder by urging the container back through the orifice.

2. The apparatus of claim 1, further comprising a locking mechanism for reversibly maintaining the container holder in at least one of the upright and inverted positions.

3. The apparatus of claim 2, wherein the locking mechanism reversibly maintains the container holder in each of the upright and inverted positions.

4. The apparatus of claim 1, further comprising a storage receptacle situated at the second position, the storage receptacle being capable of containing at least two stacked containers after they have been ejected from the container holder.

5. The apparatus of claim 4, further comprising a funnel for directing containers ejected from the container holder into the storage receptacle, the funnel having a flared conformation and a funnel orifice extending therethrough and communicating with the interior of the storage receptacle, the outwardly flared end of the funnel facing the container holder.

6. The apparatus of claim 1, wherein the container holder is pivotally mounted between a pair of handles.

7. The apparatus of claim 6, wherein the pair of handles are formed of a unitary piece of material.

8. An apparatus for peeling a liner from a lined container that includes a substrate having an outer surface and a liner that abuts a concavity defined by the substrate, the apparatus comprising

- a container holder for reversibly securing the lined container in a configuration amenable for peeling the liner therefrom across the open end of the concavity, the container holder including at least one holding surface that conforms to the outer surface of the container for securing the container during peeling of the liner therefrom, the container holder being mounted to
- a base sufficiently non-movable to maintain the container holder in place during peeling of the liner from the container,
- wherein the container holder includes a deflector for impinging upon and deflecting a tab that extends from the periphery of the liner when the container is engaged with the container holder.

9. The apparatus of claim 8, wherein container holder defines an orifice extending therethrough and the deflector is a raised ridge adjacent the orifice.

10. The apparatus of claim 9, wherein the deflector extends about substantially the entire periphery of the orifice.

11. An apparatus for peeling a liner from a lined container that includes a substrate and a liner that abuts a concavity within the substrate, the liner having a tab that extends from its periphery outside of the concavity, the apparatus comprising

- an invertible container holder having an orifice that extends therethrough and including a stop extending into the orifice for reversibly securing the lined container within the orifice while the liner is peeled therefrom, the container holder being pivotally mounted between
- a pair of handles fixed to
- a base including, at a space for receiving the container upon ejection from the container holder, a storage receptacle capable of containing at least two nested containers after they have been ejected from the container holder and a funnel interposed between the container holder and the storage receptacle, the funnel having a flared conformation and a funnel orifice extending therethrough and communicating with the interior of the storage receptacle, the outwardly flared end of the funnel facing the container holder,
- the invertible container holder being rotatable between an upright position in which the container can be inserted through an orifice extending through the container holder and reversibly secured therein while the liner is peeled from the substrate by grasping the tab and peeling it from the substrate and an inverted position in which the container can be ejected from the container holder, through the funnel, and into the storage receptacle by urging the container back through the orifice.

12. The apparatus of claim 11, wherein the orifice is circular and the stop is an O-ring that is embedded in the container holder and extends into the orifice.

* * * * *